May 13, 1952     H. F. CLARKE     2,596,530
VIBRATION MEASURING DEVICE
Filed Dec. 9, 1949

WITNESSES:
Ralph Cahil Smith
Henry Heyman

INVENTOR:
Howard F. Clarke
BY Roland A. Anderson
Attorney

Patented May 13, 1952

2,596,530

UNITED STATES PATENT OFFICE 2,596,530

VIBRATION MEASURING DEVICE

Howard F. Clarke, Pullman, Wash., assignor to the United States of America as represented by the United States Atomic Energy Commission Application December 9, 1949, Serial No. 132,164

4 Claims. (Cl. 73—70)

This invention relates to apparatus for measuring and indicating small displacements. More specifically, the invention relates to an electronic system for measuring and indicating visually the characteristics of motion of vibrating objects.

A number of prior art arrangements are available for indicating by electrical means the characteristics of motion of vibrating bodies. In many such systems, an electro-mechanical translating device is coupled to the vibrating body in order to translate the physical quantities of vibration into electrical quantities. Such translating devices generally are of the piezoelectric or magneto-inductive type. In either case, a direct physical connection is necessitated between the vibrating body and the vibration sensitive element of the translating device.

Other prior art devices utilize light beam reflection off the vibrating object and translate the light beam displacements into electrical quantities by photo-cells. Devices of this type are difficult in utilization due to the necessity of light shielding and elaborate apparatus placement.

It has been found that any form of direct physical coupling between the observed vibrating body and the translating element inherently creates a number of deleterious effects. Foremost among these is the loading effect on the vibrating body with resultant modification of its natural vibrating characteristics.

Another deleterious effect arises from the superposition of resonance characteristics of the coupling link between the translation element and the vibrating body on the vibration characteristics of the vibrating body per se. The electrical quantities derived under these conditions are not valid proportionalities to the motion of the observed body.

Other disadvantages are present in the prior art including adverse effects of vibration on the translating device. For instance, the piezoelectric translator is structurally delicate and if subject to even momentarially excessive vibration amplitudes, it is likely to fracture and thus be rendered useless. In addition, this type of translator is subject to deterioration due to environmental effects, such as for example, temperature and humidity. The magneto-inductive translator is also subject to deterioration due to fatigue and the imposition of stresses beyond the design value.

Another disadvantage in the prior art vibrating measuring devices residues in frequency limitations imposed by the mass and resilience of the physical coupling elements.

The present invention has for its object the provision of an improved vibration measuring and indicating device in which, among other advantages, no physical connection between the device and the vibrating body is required.

Further objects of the invention are the provision of a device which is highly sensitive to small displacements, capable of high speed response without distortion and responsive to vibratory phenomena over a wide range of frequencies.

The invention is directed broadly to an electronic system for translating vibratory motion of a body into electrical quantities, in which coupling is present only in the effect of the vibrating body on an impinging electro-magnetic field. The general principles of this invention are applied by transmitting electro-magnetic energy against the surface of the observed body in such manner that energy is reflected back along the transmission path, thereby creating a standing wave pattern. The amplitude and position of the standing wave thus created varies as a function of the instantaneous position of the observed surface. The provision of a stationary rectifier or detector in the standing wave pattern results in the creation of a unidirectional potential having instantaneous values corresponding to instantaneous positions of the surface of the observed body. The provision of electro-responsive indicating means, such as an oscilloscope, upon which the unidirectional potential is impressed results in a direct visible indication of the vibrational conditions under observation.

More specifically, a system is provided which comprises a wave guide, a source for injecting wave energy in the wave guide, means for supporting the vibrating body directly in the path of incident energy emitted from the wave guide so that wave energy is reflected back into the guide thus creating standing waves, and detector means supported in the wave guide for creating a varying unidirectional potential corresponding to the instantaneous amplitude and position of the standing wave pattern which, in turn, corresponds to the positions of the vibrating body. The variable unidirectional potential so created may be impressed upon any well-known suitable type of indicator, but a calibrated oscilloscope is preferred to provide a visual trace corresponding to the loci of instantaneous positions of the moving body.

For a better understanding of the present invention, together with other and further objects and advantages thereof, reference is had to the following description taken in connection with the accompanying drawing, made a part thereof, and its scope is pointed out in the appended claims.

Figure 1:
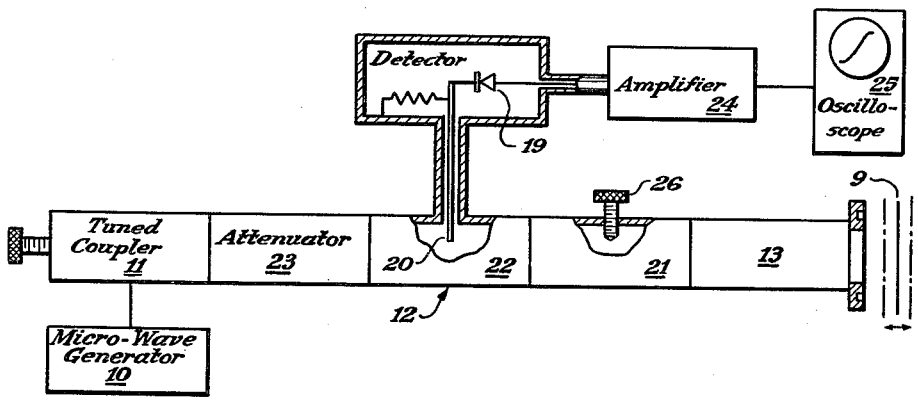
Figure 1 is a diagrammatic representation partly in section of an embodiment in accordance with the invention.

Referring to Figure 1 of the drawing, a vibrating object indicated generally by reference numeral 9 is positioned in front of the end of wave guide 12.

A micro-wave generator 10 is coupled to the wave guide and injects therein a primary wave which propagates through the wave guide and impinges on the object 9. The object 9 reflects a substantial proportion of the incident energy back into the wave guide thereby creating a standing wave condition.

The standing waves thus created present the usual loops and nodes of potential along the path of propagation. In the system of the present invention, the instantaneous position of the loops and nodes is a function of the instantaneous position of the reflecting surface of the vibrating object. It follows that the provision of a detector 19 having a stationary probe 20 inserted in the wave guide results in the creation of a unidirectional potential having instantaneous values corresponding to the instantaneous positions of the reflecting object.

To facilitate the practical application of a device constructed in accordance with the invention, it is desirable that the detector output potential be a linear function of the displacement of the vibrating object from the norm position.

To this end, effects of variation of reflected energy on the signal generated are to be avoided. For example, the impedance along a standing wave varies in accordance with the potential to current ratio. In the system herein described, no fixed impedance exists at any point in the standing wave region for the reason that the standing wave loops and nodes move to and fro synchronously with the motion of the vibrating object.

Detuning and variable load effects on the signal generator can be substantially eliminated by preventing standing waves in that part of the wave guide into which the signal generator is coupled. To this end, the attenuator section 23 is provided in the wave guide near the wave generator between the coupling section 11 and detector probe 20. Because the incident wave is of large magnitude and the reflected wave is of decreased magnitude near the generator, the attenuator is given a value such as to absorb substantially all of the reflected wave which impinges upon it.

In order that the detector output is translated into a visible indication, an amplifier 24 and an indicator 25 are provided. Although any suitable indicator may be used, it has been found desirable to utilize an oscilloscope in order to obtain an instantaneous translation of the observed phenomena into a visible indication. The indications are calibrated by adjusting the gain of the amplifier or the vertical sensitivity of the oscilloscope to obtain a selected deflection for the maximum excursion of the observed body. If the time constants of all components in the indicating system are shorter than the period of observed vibration, the indicator is validly calibrated in accordance with static deflections of the observed body.

Figure 2:
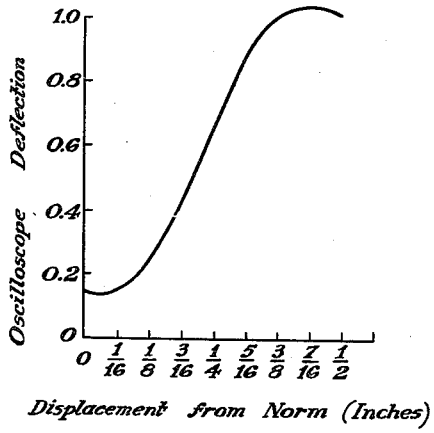
Figure 2 is a chart of indicator deflection versus observed body displacement as obtained by the device of Figure 1.

The device thus far described, under an excitation of 3.2 centimeters wave length, translates vibrations of $\frac{1}{16}$ inch into the indication of Figure 2. Referring to this figure, it is noted that a fairly linear response is obtained between $\frac{1}{8}$ inch and $\frac{3}{8}$ inch displacement, but that the indication in the range between $\frac{1}{16}$ inch and $\frac{1}{8}$ inch is not linear, and between zero and $\frac{1}{16}$ inch displacement, the indication is not usable.

It is desirable in a device of the class described to obtain potentials from the detector which are proportional to the deviation of the reflecting object from the zero or norm position and with the lowest value of unidirectional potential corresponding to the norm position of the vibrating object. It was found that this condition can be obtained by the insertion of a slug tuned section 21 between the detector probe and the free end of the wave guide. The slug is adjusted for zero detector output substantially for the norm position of the reflecting object.

Figure 3:
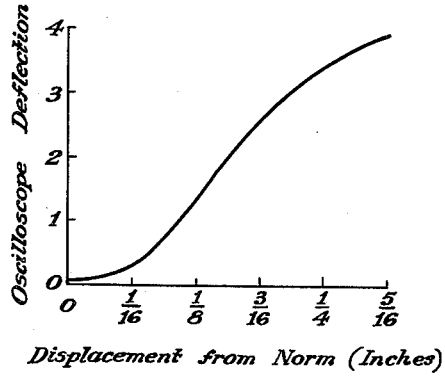
Figure 3 is a diagrammatic representation of a second embodiment arranged in accordance with the present invention.

The addition of the slug tuned section 21 with the slug adjusted to cause zero indication for the norm position of the observed object, the calibration of Figure 3 is obtained. The performance is improved in that linear response now extends down to $\frac{1}{16}$ inch displacement, and the variation in the indications between zero and $\frac{1}{16}$ inch displacement are of sufficient magnitude to be useful.

In the foregoing description, an improved vibration indicating system has been described. It is understood that the drawing shows and the specification describes a simple embodiment of the invention, and it is apparent that techniques and apparatus other than shown, may be applied without departing from the scope of the invention. For instance, the detector pick up probe and and the slug tuner may be slidably supported in the wave guide to facilitate adjustment.

It is understood also that the frequency of vibration observed may be measured by comparison in the usual manner with the calibrated sweep frequency of the oscilloscope either directly or by Lissajous techniques.

It is desired, therefore, that the invention herein described be understood to be limited only by the appended claims interpreted in view of the prior art.

What is claimed is:

1. In a device for measuring vibrational displacement of an object, means for directing incident electromagnetic wave energy along a path to impinge on said vibrating object whereby energy is re-directed in the reverse direction along said path, an antenna fixedly positioned in the wave energy path, a rectifier, means for impressing the potential created in the antenna by the incident and re-directed wave energy on the rectifier, an indicator, and means for impressing unidirectional electrical energy generated by said rectifier on the indicator.

2. In a device for measuring displacements of a vibrating object, an electromagnetic wave guide having an open end, means for inducing wave energy in the wave guide, means for supporting the wave guide so that its open end is directed toward and its longitudinal axis is intercepted by the vibrating object, a rectifier, means connected to the rectifier and supported in the wave guide whereby a unidirectional potential is generated corresponding to the wave energy in the vicinity of the last mentioned means, an indicator, and means for impressing the rectifier generated unidirectional potential on said indicator.

3. In a vibration measuring device, an electromagnetic wave guide having a closed end and an open end, means for injecting electromagnetic wave energy into the wave guide, near the closed end, means supporting the wave guide with its longitudinal axis substantially aligned with an object so emitted energy from the open end is directed against the object whereby energy reflected by the object is directed into the wave guide thereby creating a standing wave condition therein, a probe supported in the wave guide and connected to a rectifier, attenuator means supported in the wave guide between the probe and the wave energy injecting means to isolate the said wave energy injecting means from the reflected energy, visible indicator means connected to the rectifier for translating the rectified potentials into visible indications.

4. Apparatus for measuring small displacements comprising a wave guide having an open and a closed end and being adapted to be supported with the open end opposed to an observed object the displacement of which is to be measured, a micro-wave generator coupled to the wave guide proximate the closed end, a detector having a probe extending into the wave guide, an attenuator positioned in the wave guide between the micro-wave coupling and the detector probe, an oscilloscope coupled to the detector for visually indicating the standing wave condition at the probe, and adjustable tuning means interposed between the detector probe and the open end of the wave guide and adapted to adjust the oscilloscope indication to a minimum value corresponding to a rest position of the observed object.

HOWARD F. CLARKE.

REFERENCES CITED

The following references are of record in the file of this patent:

UNITED STATES PATENTS

| Number | Name | Date |
|---|---|---|
| 1,743,414 | Wente | Jan. 14, 1930 |
| 1,795,647 | Flanders | Mar. 10, 1931 |
| 2,043,984 | Alder | June 2, 1946 |
| 2,403,289 | Korman | July 2, 1946 |
| 2,467,301 | Firestone | Apr. 12, 1949 |
| 2,482,173 | Hagstrum | Sept. 20, 1949 |
| 2,488,378 | Coltman | Nov. 15, 1949 |